United States Patent Office 3,193,472
Patented July 6, 1965

3,193,472
PROCESS FOR THE PURIFICATION OF
HEXAMETHYLENEDIAMINE
Albert J. Isacks, Jr., Pensacola, Fla., assignor to Monsanto
Company, a corporation of Delaware
No Drawing. Filed Jan. 7, 1963, Ser. No. 249,582
8 Claims. (Cl. 202—57)

This invention relates to a process for the production of amines and more particularly, it relates to a process for the production of hexamethylenediamine in a high degree of purity.

Hexamethylenediamine is now a well-known compound which may be prepared on a commercial scale most conveniently by catalytically hydrogenating adiponitrile in the presence of ammonia. A principal use of hexamethylenediamine involves condensing it with dibasic acids to produce polyamides, and in manufacturing these polyamides, important advantages are obtained by reacting the diamine in a first step with an equivalent amount of dibasic carboxylic acid to form a salt using a solvent such as water, methanol, or ethanol in accordance with procedures well known in the art. This salt thus prepared is subsequently converted in a second step to the polyamide condensation product.

Although there are a number of methods for the preparation of hexamethylenediamine which are known and used in industry, none of these methods results in the production of hexamethylenediamine which is free from products of side reactions and the like. Consequently, further refinement of the crude hexamethylenediamine produced is necessary generally to obtain a product which exhibits the high degree of purity necessary when the hexamethylenediamine is to be used in industrial processes which culminate in the production of commercially saleable articles. This is especially true, for example, in the production of polyamides wherein hexamethylenediamine is reacted with adipic acid to produce polyhexamethylene adipamide which is used in many end products.

Utilization of poorly refined hexamethylenediamine in the production of polyhexamethylene adipamide causes a restriction of the molecular weight, results in a polymer having bad color characteristics and poor dyeability, and affects various other physical and chemical properties of the polymer or products made therefrom. For example, in the textile field where polyhexamethylene adipamide is used widely for the production of filaments and fibers, the use of poorly refined hexamethylenediamine results in weak filaments and fibers, as well as ones having poor color characteristics which do not meet the stringent textile standards.

One process currently in wide use throughout industry for the production of hexamethylenediamine is the hydrogenation of adiponitrile in the presence of a catalyst such as cobalt. This process is generally operated on a continuous basis by passing hydrogen and adiponitrile over or through a catalyst under conditions of elevated pressure and temperature. Liquid ammonia is added to the process to absorb exothermic heat of reaction and to limit the formation of unwanted by-products. After the crude product is formed, unwanted by-products may be removed by passing the crude product through a series of distillation stills or by chemical treatments or combinations of these methods.

It is well known in the art that one major impurity, dissolved ammonia, has not been effectively removed by fractional distillation treatments alone. Ammonia is usually generated under the condition of heating required for fractional distillation of hexamethylenediamine, and such generated ammonia redissolves in the condensed hexamethylenediamine vapors. For this reason, it has been impossible frequently to reduce the concentration of ammonia in refined hexamethylenediamine to a value below about 100–300 parts per million of ammonia. This residue of ammonia in refined hexamethylenediamine has constituted a distinct problem in the manufacture of polyamides.

It is well known in the art also that even after passing through a refining distillation train, hexamethylenediamine still contains impurities which are undesirable. It is believed that these impurities are formed both in the hexamethylenediamine production system and in the refining train. The exact nature of these impurities is unknown, however, extensive investigation has lead to the conclusion that they are principally aminohexylideneimine and the condensation products of this imine with itself and hexamethylenediamine and other types of compounds. These impurities may be called generally polarographically reducible impurities since they give rise to unsaturated bonds reduced by a polarograph, and these impurities will be so designated in this specification hereinafter and in the claims.

The following diagrammatic equations show the revrsible reactions of these types of compounds in hexamethylenediamine.

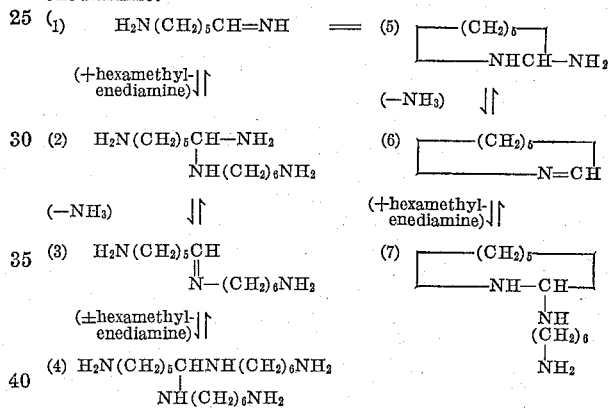

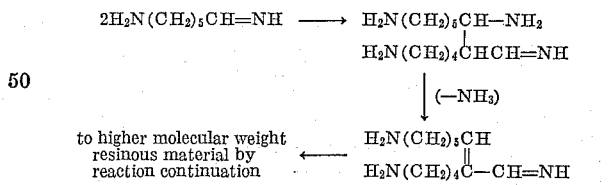

It is readily apparent that these compounds give rise to unsaturated bonds and are polarographically reducible. All are reduced by the polarograph at potentials of 1.3 to 1.5 volts. A distinct need exists in industrial processes for a method of purifying refined hexamethylenediamine to a state wherein such impurities are entirely removed or at least reduced to negligible amounts.

An object of this invention is to provide an improved process for purifying hexamethylenediamine.

Another object is to provide an improved process for reducing the ammonia and polarographically reducible impurities in refined hexamethylenediamine.

A still further object of this invention is a new and novel process for reducing or removing ammonia and polarographically reducible impurities from hexamethylenediamine during the final refining thereof.

Other objects and advantages will be apparent from the description of the invention hereinafter.

The above and other objects are accomplished according to the present invention by contacting liquid hexamethylenediamine containing dissolved ammonia with a gas inert to the system and carbon dioxide.

Any gas inert to liquid hexamethylenediamine under the conditions of the contacting treatment is suitable and examples of such suitable inert gases include nitrogen, carbon dioxide free air, and the combustion product of burned methane gas from which carbon dioxide has been removed. The inert gas and the carbon dioxide may or may not be used as a mixed gas stream for contacting, but it is preferred that the liquid hexamethylenediamine be contacted with the inert gas and carbon dioxide simultaneously.

The amount of inert gas required for contacting varies with the amount of ammonia dissolved in the liquid hexamethylenediamine but generally is from 0.001 to 15 standard cubic feet per pound of liquid hexamethylenediamine and preferably from 0.1 to 2 standard cubic feet per pound of liquid hexamethylenediamine contacted.

The amount of carbon dioxide required for the contacting of the liquid hexamethylenediamine may be from 0.5 to 10 standard cubic feet of carbon dioxide per 1,000 pounds of refining hexamethylenediamine and preferably should be from 0.75 to 2.5 standard cubic feet of carbon dioxide per 1,000 pounds of hexamethylenediamine contacted.

The method of contacting may be of any of many well known means so long as the hexamethylenediamine to be purified is in the form of a liquid and the contacting mixture of inert gas and carbon dioxide are thoroughly and completely mixed with the hexamethylenediamine to be purified. One convenient method is that of sparging the inert gas and carbon dioxide up through a vessel of liquid hexamethylenediamine. No particular design or shape in the sparging vessel is required, and design may be at the convenience of the specific installation required. Sparging in this manner is particularly advantageous as a method of concurrently mixing and purifying liquid hexamethylenediamine being treated.

Another most convenient method of even greater economy than that of sparging is that of contacting the hexamethylenediamine while it is being fractionally distilled within a distillation column with a mixture of inert gas and carbon dioxide. By this method the amount of gas and carbon dioxide required for the removal of the undesired ammonia and the suppression or removal of the polarographically reducible impurities varies not only with the amount of the ammonia dissolved in the particular amount of hexamethylenediamine, but also with the amount of reflux at which the fractional distillation is being conducted and the total throughput of hexamethylenediamine. It is clear to those skilled in the art that the amount of inert gas and carbon dioxide which is introduced in the distillation column should be maintained at the minimum level possible for the reduction or elimination of the ammonia and polarographically reducible impurities so that the presence of these gases do not impair substantially the fractionating efficiency of the column or cause excessive entrainment and loss of hexamethylenediamine through dilution.

The point of introduction of the inert gas and carbon dioxide into the fractional distillation column and its associated condenser or condensers is not critical. The inert gas and carbon dioxide may be introduced at the base of the column, at any point along the column, at the top of the column, or at the inlet of any associated condenser or condensers with equally effective results. Column efficiency is not reduced by the introduction of inert gas near the bottom or at the bottom of the refining column, and the efficiency of the reduction or removal of the ammonia and polarographically reducible impurities is not lost by the introduction of the inert gas and carbon dioxide at the inlet of the refining column's associated condenser or condensers.

The process of this invention may be employed usually in the final distillation refining stage of a hexamethylenediamine distillation purification process in that its use before this stage might well result in no noticeable effect due to the tendency of refluxing hexamethylenediamine to generate additional ammonia and polarographically reducible impurities. It is clear that the process of this invention may be employed in the final fractional distillation column of any continuous or batch type hexamethylenediamine purification process regardless of the number of prior refining stages which the process may incorporate.

It is clear also that no precautions need to be taken to free the hexamethylenediamine from water since the water will have been removed in prior stages of purification. As will be understood by those skilled in the art, very concentrated solutions of hexamethylenediamine and water may not be subject to the removal of ammonia and polarographically reducible impurities presumably because of the very high solubility of ammonia and water; however, it has been found that the saturation with water of the inert gas and carbon dioxide employed in the process of this invention has substantially no effect upon the efficiency of the process of this invention and therefore no precautions need to be taken to maintain the inert gas and carbon dioxide free from water vapor.

The following example is intended to illustrate the present invention more fully but is not to be construed as limiting the scope thereof for it is clearly possible to effect many modifications therein.

EXAMPLE I

A continuous commercial hexamethylenediamine distillation refining train comprising a foreshots column, an intermediates column, a purge column and a refining column was fed on a continuous basis with crude hexamethylenediamine which had been preheated to 125° C. The temperature in the base of the foreshots column was approximately 200° C. and the temperature in the top of this column was approximately 100° C. Ammonia and low boiling materials such as water and hexamethyleneimine were passed out of the top of the foreshots column to a condenser from which the ammonia was recovered and low boiling materials were condensed and discarded. The foreshots column tails were fed to the intermediates column which was connected in series to the purge column and in each of which a head temperature of approximately 110° to 140° C. and a pressure of 150 to 200 millimeters of mercury were maintained. A portion of the hexamethylenediamine containing a part of the 1,2-diaminocyclohexane contained in the crude hexamethylenediamine was taken off as distillate and fed to the purge column. Tails from the intermediates column containing relatively pure hexamethylenediamine were fed directly to the refining column which had a head temperature of 113° C. and in which a pressure of 42 mm. of mercury was maintained.

In the purge column the hexamethylenediamine was separated from the 1,2-diaminocyclohexane by concentrating the 1,2-diaminocyclohexane in the distillate of the purge column. The tails from the purge column were fed back to the intermediates column for redistillation therein.

In the refining column the hexamethylenediamine was distilled over the top of the column to a condenser where it was condensed and a portion thereof was returned to the upper section of the refining column as reflux, and the remainder of the hexamethylenediamine was removed as refined hexamethylenediamine. Average results of analysis of the refiner feed, refiner tails and the refined product for ammonia and polarographically reducible impurities are shown in Table 1 below wherein the units of the impurities are mols of impurities per million mols of hexamethylenediamine unless otherwise noted.

Table 1

|  | Ammonia | Polarographically Reducible Impurities |
|---|---|---|
| Refiner Feed | | 4,233 |
| Refiner Tails | | 15,368 |
| Refined Hexamethylenediamine | 183 | 843 |

The polarographically reducible impurity calculations were made on a dropping mercury electrode polarograph at 1.3 to 1.5 volts which had been calculated with heptaldehyde, one mol of which is equivalent to one mol of polarographically reducible impurity.

Following these results a mixture of an inert gas, nitrogen, and carbon dioxide was introduced at a point near the bottom of the refining column, with the nitrogen being fed at a rate of 120 standard cubic feet per 1,000 pounds of hexamethylenediamine and the carbon dioxide being fed at a rate of 1 standard cubic foot per 1,000 pounds of refined hexamethylenediamine. Since the beneficial result in the reduction of ammonia by the use of nitrogen gas was known, a continuous test was performed wherein carbon dioxide in the amount specified above was fed intermittently to the refining column with the nitrogen gas. The results of the analysis of the refined hexamethylenediamine product for ammonia and polarographically reducible impurities for this continuous test over a six-day period with and without the addition of carbon dioxide to the inert gas fed are shown in Table 2 below. All concentrations of ammonia and polarographically reducible impurities are in mols per million mols of refined hexamethylenediamine unless otherwise stated.

Table 2.—Analyses of refined hexamethylenediamine

| Date | Time | $NH_3$ | Pol. Red. Imp. | Inert Gas Condition |
|---|---|---|---|---|
| First Day | 0800 | 44 | 87 | Without Carbon Dioxide. |
|  | 1000 | 72 | | Do. |
|  | 1200 | 84 | 139 | Do. |
|  | 2115 | 28 | 27 | With Carbon Dioxide. |
|  | 2400 | 28 | 25 | Do. |
| Second Day | 0400 | 17 | 24 | Do. |
|  | 0800 | 18 | 27 | Do. |
|  | 1200 | 4 | 19 | Do. |
|  | 1600 | 23 | 28 | Do. |
|  | 2000 | 28 | 25 | Do. |
|  | 2400 | 25 | 24 | Do. |
| Third Day | 0800 | 19 | 98 | Without Carbon Dioxide. |
|  | 1200 | 19 | 78 | Do. |
|  | 1300 | 19 | 85 | Do. |
|  | 1400 | 16 | 50 | With Carbon Dioxide. |
|  | 1600 | 19 | 27 | Do. |
|  | 1800 | 18 | 61 | Without Carbon Dioxide. |
|  | 2000 | 18 | 78 | Do. |
|  | 2400 | 16 | 119 | Do. |
| Fourth Day | 0400 | 13 | 140 | Do. |
|  | 0800 | 12 | 120 | Do. |
|  | 0900 | | 152 | Do. |
|  | 1200 | 9 | 31 | With Carbon Dioxide. |
|  | 1300 | | 28 | Do. |
|  | 1600 | 9 | 30 | Do. |
|  | 2000 | 11 | 121 | Without Carbon Dioxide. |
|  | 2400 | 12 | 33 | With Carbon Dioxide. |
| Fifth Day | 0400 | 12 | 45 | Do. |
|  | 0800 | 9 | 40 | Do. |
|  | 1200 | 10 | 48 | Do. |
|  | 1600 | 10 | 50 | Do. |
|  | 2000 | 12 | 127 | Without Carbon Dioxide. |
|  | 2400 | 12 | 42 | With Carbon Dioxide. |
| Sixth Day | 0400 | 11 | 30 | Do. |
|  | 0800 | 12 | 100 | Without Carbon Dioxide. |
|  | 1000 | | 112 | Do. |
|  | 1200 | 12 | 129 | Do. |
|  | 1400 | | 157 | Do. |
|  | 1600 | 10 | 34 | With Carbon Dioxide. |
|  | 2000 | 10 | 81 | Without Carbon Dioxide. |
|  | 2400 | 14 | 121 | Do. |
|  | 0400 | 12 | 20 | With Carbon Dioxide. |

The polarographically reducible impurities calculations were made as before.

Although the reaction or reactions of this process are not known with certainty, the above results show clearly the synergistic effect that results from the addition of the combination of inert gas and carbon dioxide by the process of this invention which effects a substantial reduction of several fold in the dissolved ammonia and polarographically reducible impurities content of the refined hexamethylenediamine. The advantages of this process are more than apparent in that refined hexamethylenediamine of markedly improved purity may be obtained without great change or expense in present hexamethylenediamine refining systems and that the ammonia and polarographically reducible impurity concentration levels of the refined hexamethylenediamine may be reduced to specific reproducible levels where their presence can be tolerated without disadvantage in polyamide manufacturing process. The distinct advantage of high purity refined hexamethylenediamine may be obtained at practically no additional manufacturing cost and in most instances with no equipment changes whatsoever. Numerous other advantages of the process of this invention will be apparent to those skilled in the art from a reading of this description.

As many apparently widely different embodiments of this invention may be made without departing from the scope thereof, it is to be understood that the invention is not limited to the specific embodiment thereof except as defined in the appended claims.

What is claimed is:

1. A process for the purification of hexamethylenediamine which comprises in combination contacting liquid hexamethylenediamine containing dissolved ammonia and polarographically reducible impurities with carbon dioxide and a gas chemically inert to the said hexamethylenediamine.

2. The process of claim 1 wherein the amount of said gas used for contacting is from 0.001 to 15 cubic feet per pound of hexamethylenediamine contacted.

3. The process of claim 1 wherein the amount of carbon dioxide used for contacting is from 0.5 to 10 cubic feet per 1,000 pounds of hexamethylenediamine contacted.

4. The process of claim 1 wherein said gas is in an amount of from 0.001 to 15 cubic feet per pound of hexamethylenediamine contacted and the carbon dioxide is in an amount of from 0.5 to 10 cubic feet per 1,000 pounds of hexamethylenediamine contacted.

5. The process of claim 1 wherein said gas is in an amount of from 0.1 to 2 cubic feet per pound of hexamethylenediamine contacted.

6. The process of claim 1 wherein the carbon dioxide is in an amount of from 0.75 to 2.5 cubic feet per 1,000 pounds of hexamethylenediamine contacted.

7. The process of claim 1 wherein said gas is in an amount of 0.1 to 2 cubic feet per pound of hexamethylenediamine contacted and the carbon dioxide is in an amount of from 0.75 to 2.5 cubic feet per 1,000 pounds of hexamethylenediamine contacted.

8. The process of claim 1 wherein said gas is at least one of the group consisting of nitrogen, carbon dioxide free air, and the combustion product of methane from which carbon dioxide has been removed.

References Cited by the Examiner

UNITED STATES PATENTS

| 1,881,718 | 10/32 | Lawrie | 202—46 |
| 2,575,290 | 11/51 | Oshol et al. | 202—46 X |
| 2,889,256 | 6/59 | Campbell | 202—46 X |
| 2,977,292 | 3/61 | Ellsworth | 202—46 |
| 3,017,331 | 1/62 | Campbell et al. | |
| 3,121,671 | 2/64 | Lassiter. | |

NORMAN YUDKOFF, *Primary Examiner.*